US008191329B2

(12) United States Patent
Thiagarajan et al.

(10) Patent No.: US 8,191,329 B2
(45) Date of Patent: Jun. 5, 2012

(54) APPARATUS FOR CONNECTING PANELS

(75) Inventors: Chinniah Thiagarajan, Bangalore (IN); Frans Adriaansen, Bergen Op Zoom (NL); Bhawesh Kumar, West Lafayette, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/283,783

(22) Filed: Oct. 28, 2011

(65) Prior Publication Data

US 2012/0042599 A1    Feb. 23, 2012

Related U.S. Application Data

(63) Continuation of application No. 11/403,992, filed on Apr. 13, 2006, now Pat. No. 8,074,418.

(51) Int. Cl.
*E04B 2/00* (2006.01)
*E04C 3/00* (2006.01)
*F16B 7/00* (2006.01)
*B25G 3/24* (2006.01)
*F16G 11/00* (2006.01)
*A63H 33/08* (2006.01)
*A63H 33/06* (2006.01)

(52) U.S. Cl. ....... 52/590.1; 52/588.1; 52/578; 52/590.2; 52/590.3; 52/592.1; 403/292; 403/290; 403/302; 403/319; 446/115; 446/116; 446/120; 446/121

(58) Field of Classification Search ............. 52/590.1, 52/578, 580, 581, 588.1, 588.2, 584.1, 589.1, 52/590.2, 590.3, 591.1, 592.1, 81.1, 772; 403/290, 292, 302, 319, 295; 446/115, 116, 446/120, 121

See application file for complete search history.

(56) References Cited

U.S. PATENT DOCUMENTS

| 3,175,652 | A | 3/1965 | Brekell et al. |
| 3,641,730 | A | 2/1972 | Meckstroth |
| 4,117,638 | A | 10/1978 | Kidd, Jr. et al. |
| 4,117,640 | A | 10/1978 | Vanderstar |
| 4,251,968 | A | 2/1981 | Raith et al. |
| 4,284,370 | A | 8/1981 | Danler et al. |
| 4,750,310 | A | 6/1988 | Holcombe |
| 5,134,827 | A | 8/1992 | Hartman |
| 5,247,773 | A | 9/1993 | Weir |
| 5,295,341 | A | 3/1994 | Kajiwara |

(Continued)

FOREIGN PATENT DOCUMENTS

CH          691319 A5     6/2001

(Continued)

OTHER PUBLICATIONS

Switzerland Patent No. 0691319; Date of Publication Jun. 29, 2001; Abstract Only; 1 page.

(Continued)

*Primary Examiner* — Brian Glessner
*Assistant Examiner* — Omar Hijaz
(74) *Attorney, Agent, or Firm* — Cantor Colburn LLP

(57) ABSTRACT

Disclosed herein are connectors for panels. In one embodiment a panel connector comprises, a connector comprising a rib-hinging geometry, wherein the rib-hinging geometry comprises living hinges, and wherein the rib-hinging geometry is capable of expanding in area. In another embodiment, a panel assembly is disclosed. The panel assembly comprises, a connector comprising a rib-hinging geometry, wherein the rib-hinging geometry comprises living hinges, a socket comprising an internal geometry, wherein the connector can be assembled to the internal geometry, and wherein the rib-hinging geometry is capable of expanding in area.

18 Claims, 9 Drawing Sheets

U.S. PATENT DOCUMENTS

| | | | |
|---|---|---|---|
| 5,333,421 | A | 8/1994 | McKenna |
| 5,421,473 | A | 6/1995 | McCrossen |
| 5,613,338 | A | 3/1997 | Esposito |
| 5,787,642 | A | 8/1998 | Coyle et al. |
| 6,036,398 | A | 3/2000 | Theodorou |
| 6,079,168 | A | 6/2000 | Shaver |
| 6,122,879 | A | 9/2000 | Montes |
| 6,164,024 | A | 12/2000 | Konstantin |
| 6,182,403 | B1 | 2/2001 | Mimura et al. |
| 6,295,778 | B1 | 10/2001 | Burt |
| 6,311,436 | B1 | 11/2001 | Mimura et al. |
| 6,331,028 | B1 | 12/2001 | O'Neill et al. |
| 6,336,304 | B1 | 1/2002 | Mimura et al. |
| 6,542,353 | B2 | 4/2003 | Ardrey et al. |
| 6,562,907 | B2 | 5/2003 | Johoji et al. |
| 6,959,519 | B2 | 11/2005 | Adriaansen |
| 2002/0055572 | A1 | 5/2002 | Tai et al. |
| 2002/0066660 | A1 | 6/2002 | Ardrey et al. |
| 2002/0108343 | A1 | 8/2002 | Knauseder |
| 2002/0120065 | A1 | 8/2002 | Johoji et al. |
| 2003/0024199 | A1 | 2/2003 | Pervan et al. |
| 2005/0287371 | A1 | 12/2005 | Chaudhari et al. |
| 2007/0251183 | A1 | 11/2007 | Thiagarajan et al. |

FOREIGN PATENT DOCUMENTS

| | | | |
|---|---|---|---|
| DE | 2824759 | A1 | 12/1979 |
| DE | 3214890 | A1 | 11/1983 |
| DE | 3604951 | A1 | 8/1987 |
| EP | 0473321 | A1 | 3/1992 |
| EP | 0783064 | A1 | 7/1997 |
| EP | 0864708 | A2 | 9/1998 |
| EP | 0933490 | A2 | 8/1999 |
| EP | 1111153 | A2 | 6/2001 |
| FR | 2732386 | A1 | 10/1996 |
| GB | 2386636 | A | 9/2003 |
| WO | 9320320 | A3 | 10/1993 |
| WO | 0037846 | A1 | 6/2000 |
| WO | 0065172 | A1 | 11/2000 |
| WO | 0120241 | A2 | 3/2001 |
| WO | 2006095201 | A1 | 9/2006 |
| WO | 2008152637 | A1 | 12/2008 |

OTHER PUBLICATIONS

German Patent No. 2824759, (Machine Translation); Date of Publication: Dec. 13, 1979, Abstract Only, 2 pages.

German Patent No. 3214890, Nov. 3, 1983; Abstract only; 1 page.

German Patent No. 69621698T; Date of Publication; Nov. 7, 2002; Abstract Only; 1 page.

European Patent No. 0741215; Date of Publication: Nov. 6, 1996; Abstract Only; 1 page (Equivalent to French Patent No. 2732386 A; Date of Publication Oct. 4, 1996).

European Patent No. 0783064; Date of Publication: Jul. 9, 1997; Abstract Only; 1 page.

German Patent No. 3604951 (A1); Publication Date: Aug. 20, 1987; Abstract Only; 1 Page.

International Search Report; International Application No. PCT/US2010/034485; International Filing Date: May 12, 2010; Date of Mailing: Sep. 9, 2010; 8 Pages.

Written Opinion of the International Searching Authority; International Application No. PCT/US2010/034485; International Filing Date: May 12, 2010; Date of Mailing: Sep. 9, 2010; 8 Pages.

International Search Report; International Application No. PCT/US2007/080072; International Filing Date: Oct. 1, 2007; Date of Mailing: Jul. 17, 2008; 6 pages.

Written Opinion of the International Searching Authority; International Application No. PCT/US2007/080072; International Filing Date: Oct. 1, 2007; Date of Mailing: Jul. 17, 2008; 6 pages.

APPARATUS FOR CONNECTING PANELS

CROSS REFERENCE TO RELATED APPLICATIONS

This application is a continuation of U.S. application Ser. No. 11/403,992, filed Apr. 13, 2006, which is incorporated herein by reference in its entirety.

TECHNICAL FIELD

The present disclosure relates generally to connectors and joints for multiwall panels. More specifically, this application relates to connectors and joints for multiwall roofing or wall panels.

BACKGROUND

In the construction of naturally lit structures, such as greenhouses, pool enclosures, solar roof collectors, stadiums and sunrooms, glass panel roofs have been employed to allow natural light to shine therein. The glass panels themselves can be mounted in frame-like enclosures that are capable of providing a watertight seal around the glass panel and provide a means for securing the panel to a structure. These frame-like enclosures also provide for modular glass roofing systems that can be assembled together to form the roof.

Glass panel roofing systems generally provide good light transmission and versatility. However, the initial and subsequent costs associated with these systems limit their application and overall market acceptance. The initial expenses associated with glass panel roofing systems comprise the cost of the glass panels themselves as well as the cost of the structure, or structural reinforcements, that are employed to support the high weight of the glass. After these initial expenses, operating costs associated with the inherently poor insulating ability of the glass panels can result in higher heating expenses for the owner. Yet further, glass panels are susceptible to damage caused by impact or shifts in the support structure (e.g., settling), which can result in high maintenance costs. This is especially concerning for horticultural applications wherein profit margins for greenhouses can be substantially impacted due to these expenditures.

As a result, multiwall polymeric panels (e.g., polycarbonate) have been produced that exhibit improved impact resistance, ductility, insulative properties, and comprise less weight than comparatively sized glass panels. As a result, these characteristics reduce operational and maintenance expenses.

For ease of design and assembly, multiwall panels can be produced in modular systems. The modular systems can comprise multiwall panels and panel connectors, wherein the panel connectors (hereinafter referred to as "connectors") are employed to join the panels together and/or secure the panels to a structure on which they are employed.

Connectors endure high forces over their service life. Examples of such forces are caused by high winds (e.g., lifting force acting about perpendicular to roof), supporting heavy snowfall (compression force acting about perpendicular to roof), or tension/compression forces caused by contraction and/or expansion during changing climates (e.g., forces acting about parallel with roof). Regardless of the cause, connectors that can withstand such multidirectional forces are desirable. Yet further, connectors that can withstand such forces and can be manufactured utilizing cost-competitive means are even more desirable.

Accordingly, there is a continuous need for multiwall connectors that are capable of withstanding multidirectional forces and can be manufactured utilizing cost competitive methods. Several connectors and methods of manufacture are disclosed herein.

BRIEF SUMMARY

Disclosed herein are connectors for multiwall panels.

In one embodiment, a panel connector is disclosed. The panel connector comprises, a connector comprising a rib-hinging geometry, wherein the rib-hinging geometry comprises living hinges, and wherein the rib-hinging geometry is capable of expanding in area.

In another embodiment, a panel assembly is disclosed. The panel assembly comprises, a connector comprising a rib-hinging geometry, wherein the rib-hinging geometry comprises living hinges, a socket comprising an internal geometry, wherein the connector can be assembled to the internal geometry, and wherein the rib-hinging geometry is capable of expanding in area.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Disclosed herein are connectors that comprise rib-hinging geometries. To be more specific, rib-hinging geometries are capable of reversibly altering their shape when acted upon by a kinetic force (e.g., wind, snow, structural, servicing, and so forth). When incorporated into multiwall connectors, rib-hinging geometries provide connections that exhibit increased retention or contact forces of mating connectors and/or panels.

Rib-hinging geometries comprise negative-force expanding and positive-force expanding geometries. Negative-force expanding geometries comprise any geometry that exhibits a negative Poisson's ratio (e.g., auxetic geometries). Positive-force expanding geometries comprise any geometry that exhibits a positive Poisson's ratio. Poisson's ratio is the ratio of transverse strain to longitudinal strain for materials and/or geometries. The formula for Poisson's ratio is:

$-[\epsilon_{transverse}/\epsilon_{longitudinal}]$=Poisson's Ratio wherein, $\epsilon_{transverse}$=Transverse Strain $\epsilon_{longitudinal}$=Longitudinal Strain In accordance with Poisson's ratio, when a force acts on a rib-hinging geometry, the geometry will respond by changing in shape. For negative-force expanding geometries, the shape of the geometry will transversely contract under compression loading and transversely expand under tensile loading. Alternatively, positive-force expanding geometries will transversely contract under tensile loading and transversely expand under compressive loading.

Advantageously, rib-hinging geometries have been incorporated into multiwall connectors, wherein these connectors are capable of generating an increase in retention forces between the assembled mating geometries in response to a force (e.g., tensile, compressive, bending) acting thereon. As used herein, these retention forces are defined as any force or forces that are exerted by any component of the assembly onto another component of the assembly to result in an increased resistance to the disassembly of the assembly, wherein the forces can be contact forces, frictional forces and the like. To be more specific, the rib-hinging connectors described herein increase in transverse area if acted upon by an adequate force (to be discussed further below). As a result of this increase in transverse area, greater forces are exerted on the surfaces in contact with the transverse area and an increase in retention forces results.

Figure 1:
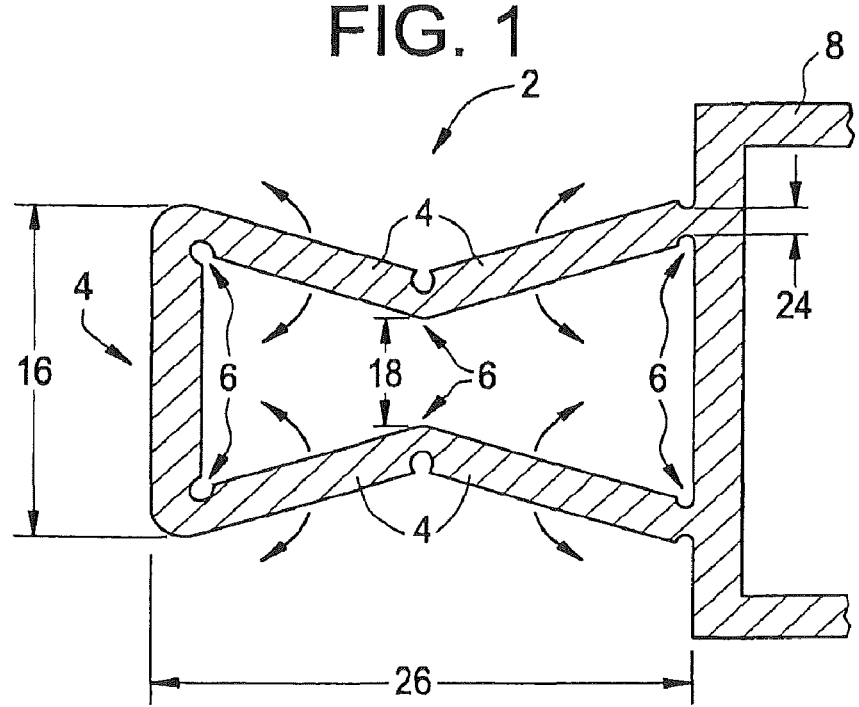
FIG. 1 is a side view of an exemplary negative-force expanding connector.

Referring now to FIG. 1, a side view of an exemplary negative-force expanding connector 2 is shown. In the illustration, the negative-force expanding connector 2 (hereinafter referred to as "NFE connector") comprises a bow-tie-like geometry having a connector outer width 16, connector inner width 18, and a length 26. The NFE connector 2 comprises members 4 that are connected to one another by living hinges 6. The NFE connector 2 is integrally attached to a first structure 8. The living hinges 6 are capable of allowing the member(s) 4 attached thereto to deflect rotationally when acted upon by a force (deflection illustrated by the directional arrows). The living hinges 6 are defined by a hinge thickness 24, which can be uniform for the living hinges 6 on the NFE connector 2. The connector's bow-tie-like geometry is auxetic in nature, that is, the geometry will expand transversely under tension.

Figure 2:
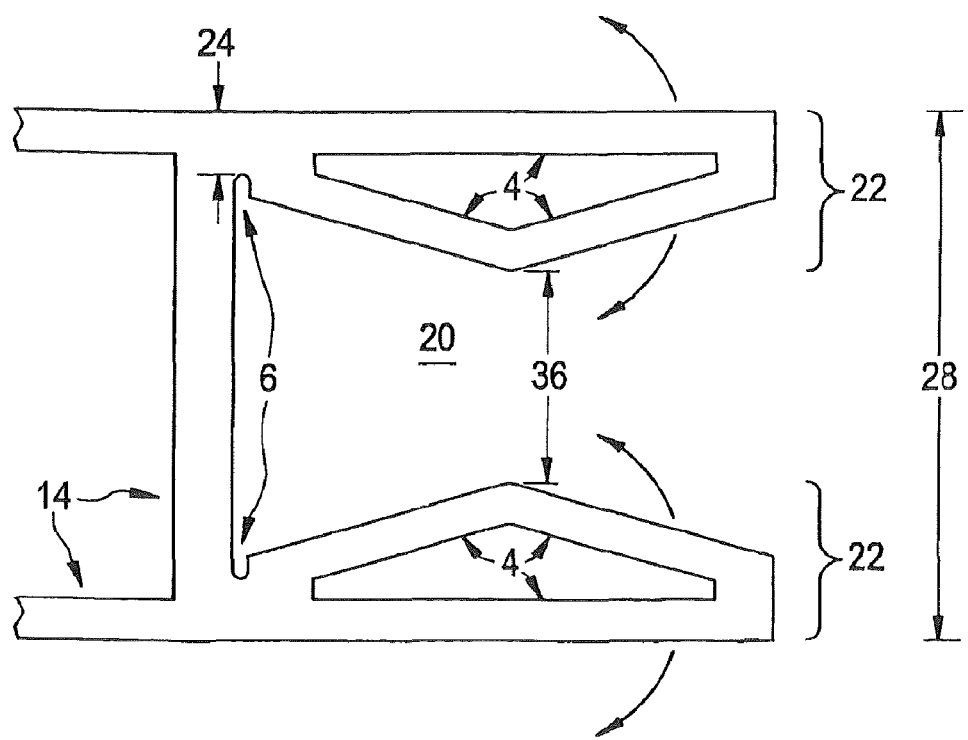
FIG. 2 is a side view of an exemplary negative-force expanding socket.

Referring now to FIG. 2, a side view of an exemplary negative-force expanding socket 20 is shown (hereinafter referred to as "NFE socket"). The NFE socket 20 comprises a socket outer width 28 and socket inner width 36. The socket's geometry is configured to allow the NFE connector 2 illustrated in FIG. 1 to assemble therein. The NFE socket 20 comprises two interference members 22 that comprise three members 4 each. The interference members 22 are connected to a second structure 14 via living hinges 6, which are capable of allowing the interference members 22 attached thereat to deflect rotationally when acted upon by a force (deflection illustrated by the directional arrows). The living hinges 6 are defined by a hinge thickness 24.

Figure 3:
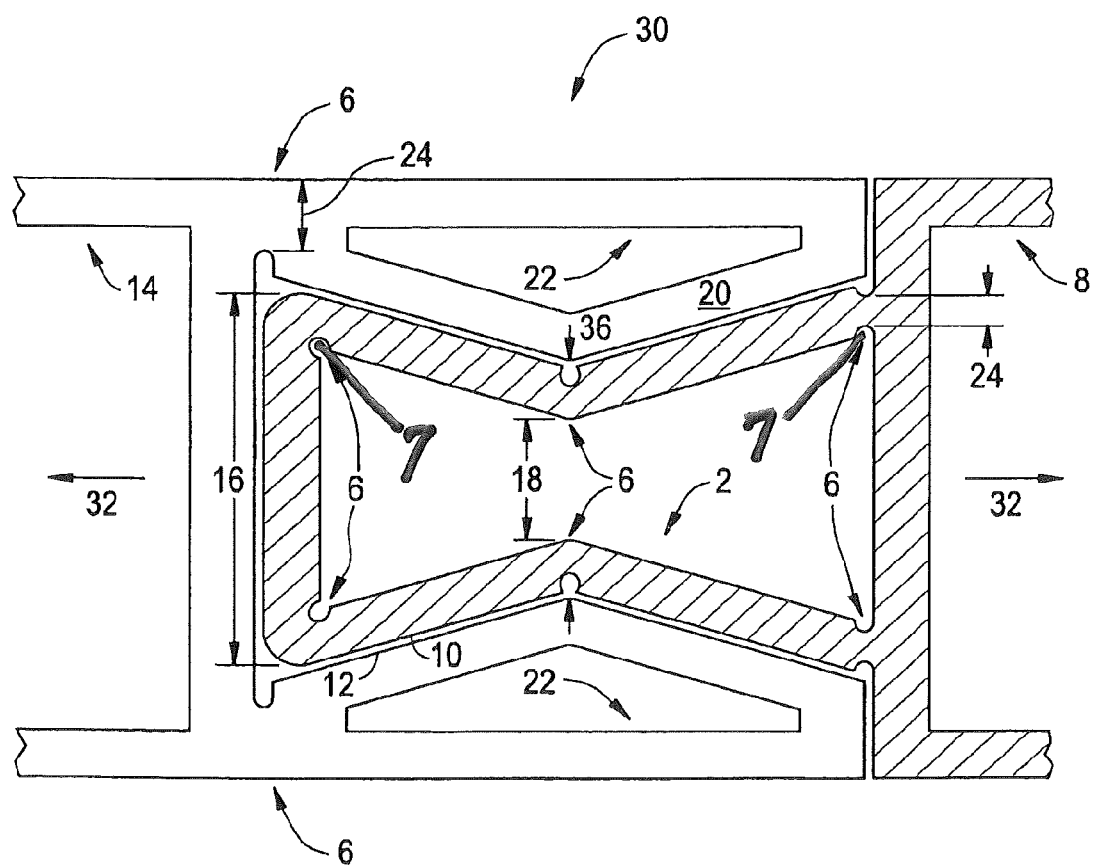
FIG. 3 is a partial and side view of a negative-force expanding assembly.

Referring now to FIG. 3, a partial and side view of a negative-force expanding assembly (hereinafter referred to as "NFE assembly"), which is generally designated 30, is illustrated. In the illustration, the NFE connector 2 has been assembled within the NFE socket 20 to form the NFE assembly 30. When assembled, the NFE connector 2 and NFE socket 20 generally resist being disassembled from one another due to the interference created by their respective geometries. To be more specific, the connector outer width 16 of the NFE connector 2 is greater than the socket inner width 36 of the NFE socket 20. The interference (e.g., increased contact force) between the NFE connector 2 and the NFE socket 20 hinders disassembly. To be even more specific, if a disassembly force(s) 32 is applied to the NFE connector 2 and/or to the NFE socket 20, wherein the disassembly force is not capable of deforming the living hinges 6 on the NFE connector 2, nor on the NFE socket 20, the connector's contact surfaces 10 contact the interference members' contact surfaces 12 and impede disassembly via interference. The NFE connector 2 includes an open cavity 7 within the living hinge 6 before assembly, after assembly, and/or before and after assembly.

If disassembly force(s) 32 are applied to the NFE assembly 30 that are sufficient to deform the living hinges 6, the NFE connector's length 26 and its connector inner width 18 will increase (i.e., increase in transverse area), which will cause the NFE connector 2 to exert forces on the surfaces of the interference member's contact surfaces 12 that contact the transverse area (e.g., the connector's contact surfaces 10 exert force on the interference member's contact surfaces 12). As a result of the forces exerted by the NFE connector 2 on the NFE socket 20, retention forces increase (e.g., interference between the NFE connector 2 and the NFE socket 20 increases, contact surface area increases, frictional forces increase), which act to further resist disassembly.

The living hinges 6 on the interference members 22 can be designed to deflect at a higher load than the living hinges 6 on the NFE connector 2. This can be achieved by increasing the hinge thickness 24 of the NFE socket 20 compared to the hinge thickness 24 of the NFE connector 2, if the materials employed for the NFE socket 20 and NFE connector 2 are similar. This can also be achieved by employing a material comprising a higher flexural modulus for the NFE socket 20 compared to the NFE connector 2. Designing the NFE assembly 30 in this manner can be advantageous as it ensures the interference members 22 do not deflect proportionately with the NFE connector 2 and enables the interference members 22 to counter the retention forces generated. To be more specific, if the living hinges 6 on the interference members 22 deform under the same load as the living hinges 6 on the NFE connector 2, the interference members 22 would not be capable of counteracting the forces generated by the increasing transverse area of the NFE connector 2. As a result, the retention forces generated would not increase as desired. However, if the living hinges 6 on the interference members 22 are designed to deflect at a higher loading than the living hinges 6 on the NFE connector 2, the interference members 22 would be capable of counteracting the forces generated by the NFE connector 2 and greater retention forces would be generated up to the point that the forces deflect the interference members 22. Therefore, the living hinges 6 on the interference members 22 can be designed to deflect at a force significantly greater than that required to deflect the members 4. Significantly greater can be a force that is greater than or equal to about 50% higher, or more specifically, greater than or equal to about 100% higher, or even more specifically, greater than or equal to about 200% higher, and all subranges therebetween. However, if desired, the living hinges 6 on the interference members 22 can also be designed to allow the connection to be disassembled without imparting damage to the NFE connector (e.g., buckling of members 4, permanently deforming of living hinges 6 (e.g., stretching), breaking living hinges 6). The specific design of the living hinges 6 however will be dependent on many variables (e.g., desired retention forces, desired disassembly forces) and is therefore application specific.

Figure 4:
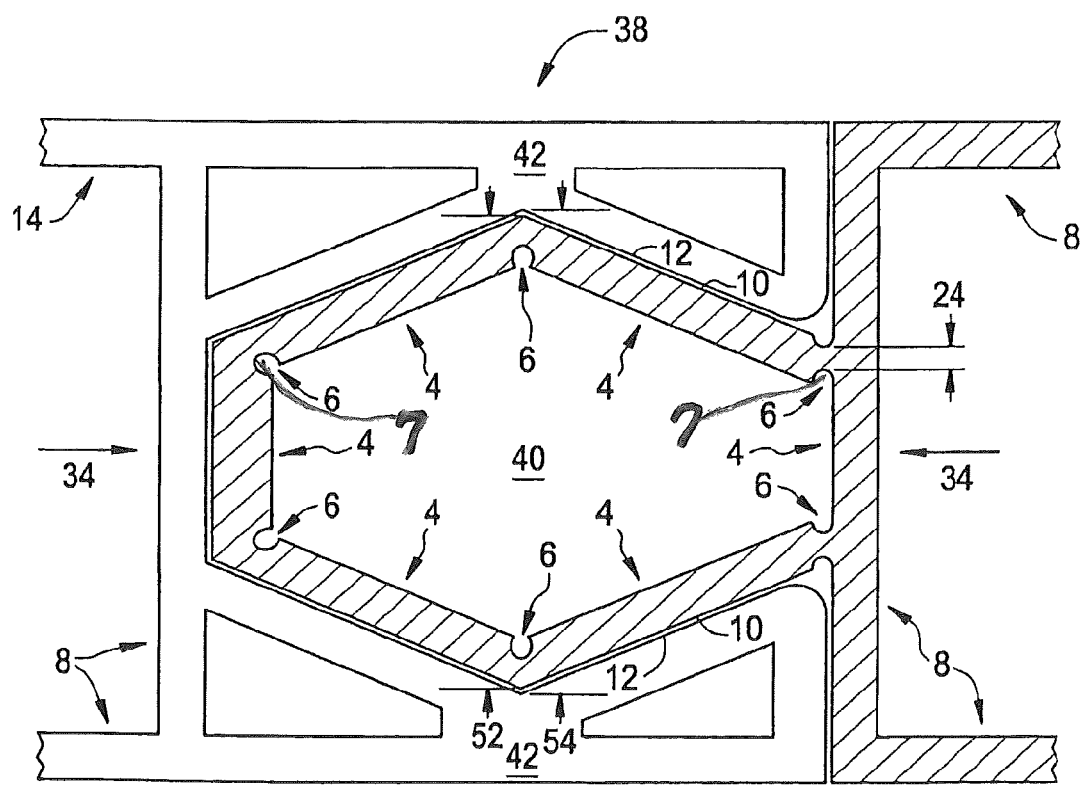
FIG. 4 is a side view of an exemplary positive-force expanding assembly.

Referring now to FIG. 4, a side view of an exemplary positive-force expanding assembly (hereinafter referred to as "PFE assembly"), which is generally designated 38, is illustrated. In the illustration, a positive-force expanding connector 40 (hereinafter referred to as "PFE connector") is shown assembled in a positive-force expanding socket 42 (hereinafter referred to as "PFE socket"). The PFE connector 40 comprises a hexagonal geometry that is formed by six members 4 having a connector transverse width 52. The members 4 are connected to each other and to a first structure 8 by living hinges 6. The living hinges 6 are capable of allowing the member(s) 4 attached thereto to deflect rotationally when acted upon by a force. The PFE connector 40 includes an open cavity 7 within the living hinges 6 before assembly, after assembly, and/or before and after assembly. The living hinges 6 are defined by a hinge thickness 24, which can be uniform for all of the living hinges 6 employed on the PFE connector 40. The connector's hexagonal geometry is non-auxetic in nature, that is, the geometry will expand transversely under compressive force.

The PFE socket 42 comprises a socket transverse width 54. The socket's geometry is configured to allow the PFE connector 40 to be assembled therein. The PFE socket 42 comprises a hexagonal shape that is configured to allow the PFE connector 40 to be assembled therein.

When the PFE connector 40 and PFE socket 42 are acted upon by a compressive force(s) 34 that is adequate to deform its living hinges 6, the PFE connector 40 acts as a rib-hinging mechanism, expanding in transverse area, and increasing retention forces between the PFE connector 40 and the PFE socket 42. To be more specific, as a compressive force 34 is applied to the PFE connector 40, the living hinges 6 will deform to increase its connector transverse width 52. This causes the force exerted by the connector's contact surfaces 10 on the interference member's contact surfaces 12 to increase, which increases interference between the PFE connector 40 and the PFE socket 42, contact surface area, friction, and other retention forces, which act to further resist disassembly.

Figure 5:
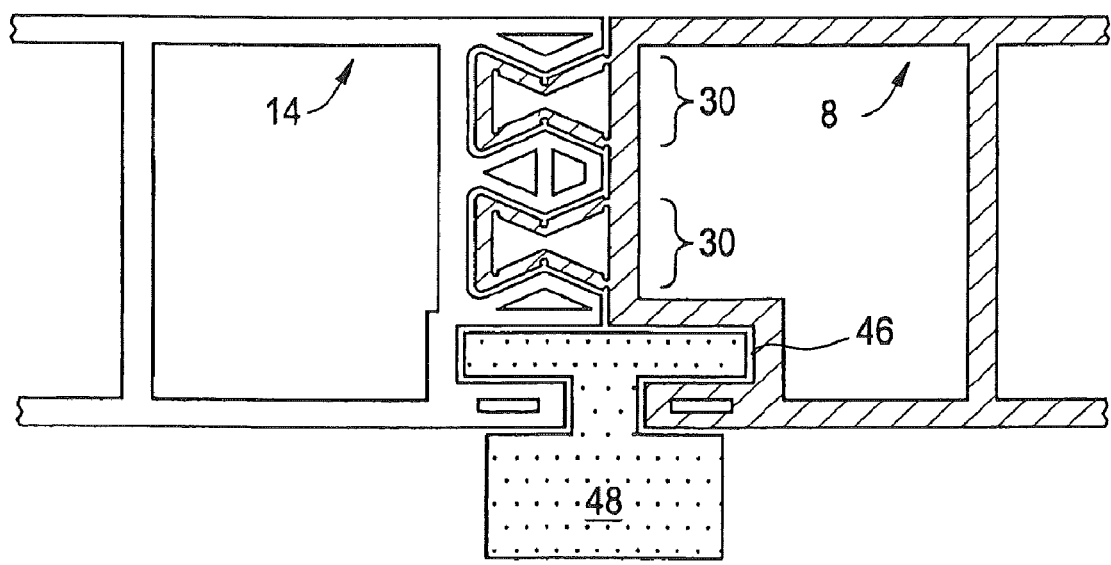
FIG. 5 is a side view of a negative-force expanding assembly comprising two NFE connectors.

The negative-force expanding assembly 30 and the positive-force expanding assembly 38 can be employed in any application wherein a rib-hinging mechanism can provide improved connection performance. For example, in an application wherein tensile forces are expected a connector comprising a negative-force expanding assembly 30 can be employed. In addition, embodiments can be designed to comprise multiple PFE connectors or multiple NFE connectors, which can provide yet further increased resistance to disassembly. For example, in FIG. 5 a side view of a negative-force expanding assembly 30 comprising two NFE connectors 2 is illustrated. In the illustration the two NFE connectors 2 are employed to connect a first structure 8 to a second structure 14.

Referring again to FIG. 5, the first structure 8 and second structure 14 are configured to form a support feature 46. The support feature 46 can comprise any geometry incorporated into either and/or both structures (e.g., first structure 8 and second structure 14) that is capable of being employed for supporting, connecting, securing and/or fixating a connector assembly (e.g., NFE assembly 30, PFE assembly 38) to a supporting structure or component. The support feature 46 can comprise a pocket-like geometry that can be attached about a support member 48, for example.

In yet another embodiment, an assembly can be formed from both PFE connectors and NFE connectors to form a multi-connector assembly.

Figure 6:
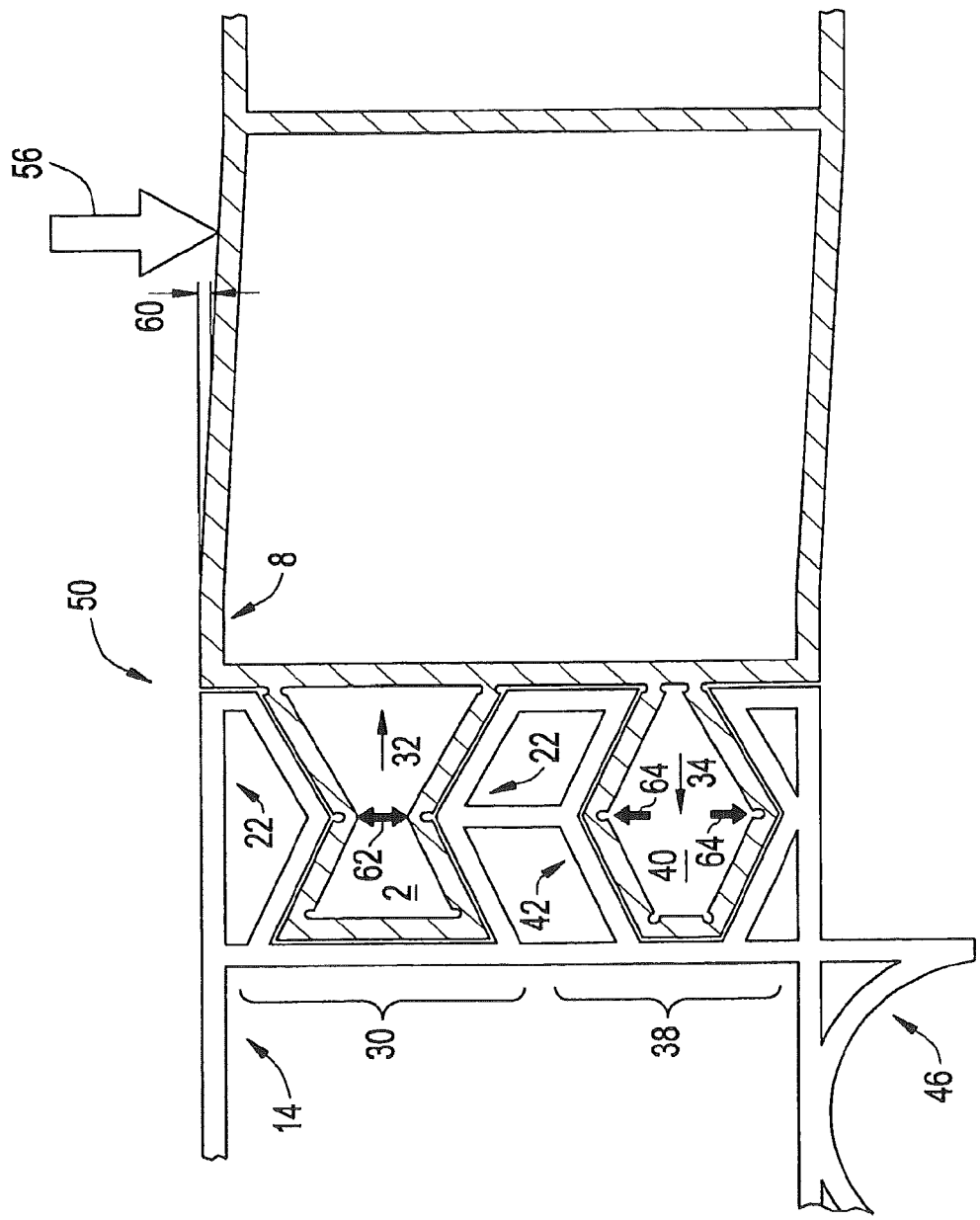
FIG. 6 is a side view of a multi-connector assembly.

Referring now to FIG. 6, a side view of a multi-connector assembly, generally designated 50, is illustrated. In the illustration, an exemplary multi-connector assembly comprises a first structure 8 and a second structure 14. The first structure 8 comprises a PFE connector 40 and a NFE connector 2 (hereinafter referred to as "connectors"), and the second structure 14 comprises a PFE socket 42 and an NFE socket 20 (hereinafter referred to as "sockets"). The connectors and sockets are assembled together.

The first structure 8 comprises a multiwall panel for use as a roofing material for naturally lit structures (e.g., greenhouses). In this embodiment, the second structure 14 is a support connector that is used to connect multiple multiwall panels thereto (i.e., first structure 8) and provide support for the panels via a support feature 46. In this particular embodiment the support feature 46 is adapted to secure the support connector (i.e., structure 8) to an aluminum tube greenhouse structure, and thus comprises an annular design.

The multi-connector assembly 50 can advantageously produce an improved connection as compared to employing a negative-force expanding assembly 30 and/or a positive-force expanding assembly 38 alone. To be more specific, by employing a NFE assembly 30 and a PFE assembly 38 in the multi-connector assembly 50, the multi-connector assembly 50 can perform well under both compressive force(s) 34 and disassembly force(s) 32. Yet further, the multi-connector assembly 50 provides the non-intuitive advantage of enhanced retention performance under non-linear forces.

Non-linear forces are forces that comprise a force component that acts perpendicular to either a compressive force(s) 34 or a disassembly force(s) 32 (e.g., any force that is not a linear force, wherein linear forces are either compressive force(s) 34 or a disassembly force(s) 32). For example, when a force is applied to the multi-connector assembly 50 illustrated in FIG. 6, the first structure 8 can flex, as shown by flexing 60. The flexing 60 causes the first structure to generate disassembly force(s) 32 on the NFE assembly 30 and a compressive force(s) 34 on the PFE assembly 38. As a result, the NFE assembly 30 and PFE assembly 38 generate forces 62 and 64, via the rib-hinging mechanism, respectively, which generate increased retention forces via the rib-hinging mechanism.

Although the multi-connector assembly 50 illustrated in FIG. 6 comprises one negative-force expanding assembly 30 and one positive-force expanding assembly 38, a multi-connector assembly can be configured with any combination and/or configuration of connectors and sockets, such as: NPNPN, NPPN, NNPPNN, NNPNN, PNNNP, and so forth, wherein N=an NFE assembly 30 and P=a PFE assembly 38. In addition, although previously discussed, any of the connectors disclosed (e.g., multi-connector assembly 50, NFE assembly 30, PFE assembly 38), alternative embodiments, as well as combinations comprising at least one of the foregoing, can be employed to join any structures (e.g., first structure 8, second structure 14) together. The specific configuration of the connectors employed (e.g., types of connectors, connector length, connector width) can be determined by the desired performance of the connection (e.g., disassembly force(s) 32 that will cause a connection to separate).

Figure 7:
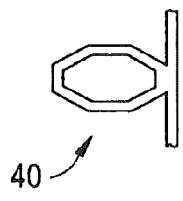
FIG. 7 is a side view of a PFE connector having an exemplary polygonal geometry.
Figure 8:
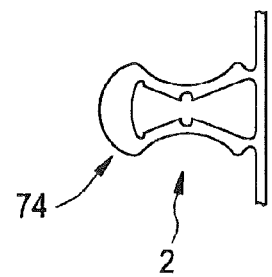
FIG. 8 is a side view of a NFE connector having an exemplary arced structure.

The connectors (e.g., NFE connector 2, PFE connector 40) can comprise any geometry that produces a rib-hinging mechanism. Exemplary connector geometries can comprise polygonal structures (such as the exemplary PFE connector 40 illustrated in FIG. 7), arced structures (such as the exemplary NFE connector 2 illustrated in FIG. 8), irregular geometries (such as the exemplary NFE connector 2 illustrated in FIG. 9), and so forth, as well as combinations comprising at least one of the foregoing. Similarly, sockets (e.g., NFE socket 20, PFE socket 42) can also comprise geometries that are polygonal, comprising arcs, irregular, and so forth, as well as combinations comprising at least one of the foregoing.

Figure 9:
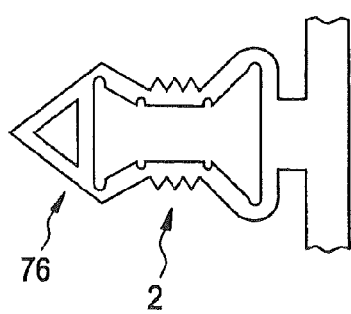
FIG. 9 is a side view of a NFE connector having an exemplary irregular structure.

The connectors and/or sockets can be configured to allow for ease of assembly. To provide such, the connectors can comprise tapered designs that are capable of encouraging a connector to assemble within a socket. An exemplary tapered design is illustrated in FIG. 9, wherein the connector comprises a tapered section 74. Although illustrated as a straight taper, a tapered section 74 can comprise any geometry that can encourage assembly of a connector and socket, such as the radiused tapered section 7 illustrated in FIG. 8, which comprises an arced geometry.

Figure 10:
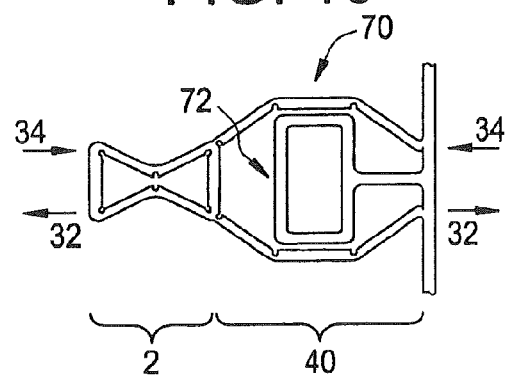
FIG. 10 is a side view of an exemplary modified connector.

In yet another embodiment, a single connector can comprise both a NFE connector 2 and PFE connector 40, such as the exemplary modified connector 70 illustrated in FIG. 10. In this embodiment, the modified connector 70 comprises an NFE connector 2 and a PFE connector 40. Comprising both connectors allows the modified connector 70 to provide increased retention forces when acted upon by a disassembly force(s) 32 and a compression force(s) 34.

The connectors described herein can comprise internal features that can limit the collapse of a rib-hinging geometry. For example, referring back to FIG. 10, the exemplary internal feature 72 is illustrated. To be more specific, internal features can be employed to limit the collapse of a rib-hinging geometry, such as in a NFE connector 2 which can collapse as the result of a compressive force(s) 34, or in a PFE connector which can collapse as the result of a disassembly force 32.

Additional components can also be incorporated into the design of the connectors and/or sockets. Exemplary components comprise: gaskets, ribs, seals, snap-fits, alignment features, depth stops, and the like, as well as combinations comprising at least one of the foregoing components can also be employed.

The living hinges 6 illustrated herein are embellished for illustrative purposes to explicate the function of the living hinges 6. The living hinges 6 illustrated are exemplary, and one skilled in the art will recognize that the hinge thicknesses 24, as well as length, width, depth, geometry, and other variables can be modified to configure the properties of the hinge. In one example, the living hinges can be of the same thickness as a member 4, and therefore flexure of the member 4 provides a living-hinge-like function.

The connectors and sockets can comprise thermoplastics, such as, polycarbonate, acrylic, impact-modified polystyrene, acrylonitrile-butadiene-styrene, styrene acrylonitrile, polymethyl methacrylate, polyethylene terephthalate, polybutylene terephthalate, polyethylene, polypropylene, polyetherimide, and so forth, as well as combinations comprising at least one of the foregoing. The connectors and sockets can also comprise metals, such as aluminum, copper, steels (e.g., martensitic, ferritic, and austenitic materials), metal alloys (e.g., nickel-titanium), and so forth, as well as combinations comprising at least one of the foregoing. In one specific embodiment, the NFE connector 2 can be formed from a polycarbonate resin (e.g., Lexan®, commercially available from SABIC Innovative Plastics) and a NFE socket 20 can be formed from aluminum. In yet another embodiment, a multi-connector assembly 50 can comprise a first structure 8 having a NFE connector 2 and a PFE socket 42 and a second structure 14 configured with a NFE socket 20 and a PFE connector 40, wherein both structures are formed from polycarbonate.

Additives can be optionally added to any polymeric materials employed for the connectors or sockets as long as the additives do not substantially adversely affect the desired properties (e.g., flexural properties). Several exemplary additives include; antioxidants (e.g., organophosphites), fillers and reinforcing agents (e.g., glass fibers, carbon fibers, aramid fibers, silicates, $TiO_2$, graphite, calcium carbonate, mica, talc and the like), lubricants, UV absorbers, stabilizers (e.g., light stabilizers and heat stabilizers), lubricants, plasticizers, colorants (e.g., pigments or dyes), anti-static agents, blowing agents, impact modifiers, and so forth.

Figure 11:
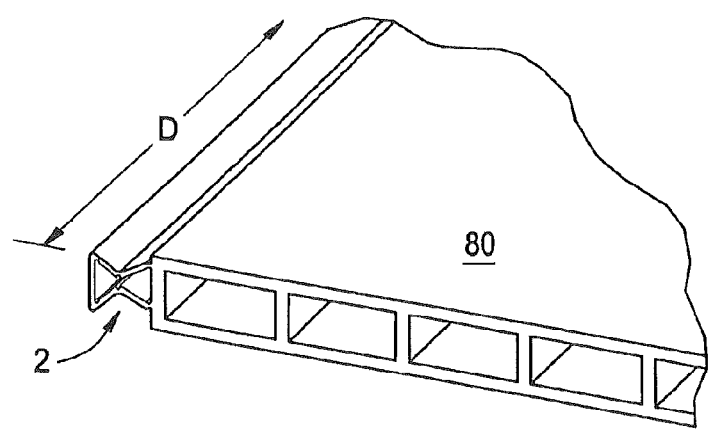
FIG. 11 is a partial oblique view of an exemplary NFE connector and first structure.

The depth of the connectors and sockets can be tailored based on the application. For example, referring now to FIG. 11, a partial oblique view of an exemplary multiwall panel 80 comprising an NFE connector 2 is illustrated. The multiwall panel 80 and the NFE connector 2 comprise a depth, D that can comprise any length that is desired for the multiwall panel 80, such as equal to or greater than about 2 feet, ft (0.610 meters, m), or more specifically, equal to or greater than about 4 ft (1.219 m), or even more specifically, equal to or greater than about 6 ft (1.829 m). Although not illustrated, a second multiwall panel could be produced to comprise a NFE socket 20, which could be assembled to the NFE connector 2.

The connectors and sockets can comprise a depth that is shorter than the structure (e.g., first structure 8, second structure 14, and support feature 46) on which they are to be attached. In this embodiment, the connectors and sockets can be separately formed and secured to the structure utilizing fastening methods. Such methods comprise, adhesive bonding (e.g., solvent based bonds, multi-component adhesives, or single-component adhesives), fasteners (e.g., screws, bolts, rivets, pins, staples, nails, and brads), melt bonding (e.g., hot staking, ultrasonic welding, and hot-melt adhesives), and so forth, as well as combinations comprising at least one of the foregoing. In one embodiment, a NFE connector 2 can comprise a depth of 1.0 inch (2.54 centimeters), wherein six of these connectors can be screwed to a multiwall panel 80.

The connectors and/or sockets can be formed from polymer processing methods, such as extrusion or injection molding. However, continuous production methods, such as extrusion, generally offer improved operating efficiencies and greater production rates than non-continuous operations (e.g., injection molding). In one specific example of a continuous production operation, a single screw extruder is employed to extrude polycarbonate resin. The polycarbonate melt is fed through a profile die that is capable of forming a connector and/or socket, such as the multi-connector assembly 50 illustrated in FIG. 6. The extrudate then travels through a sizing apparatus (e.g., vacuum bath) and is cooled below its glass transition temperature (e.g., about 297° F. (147° C.)). After being cooled, the profile can be cut to length utilizing an extrusion cutter, such as an in-line indexing saw. Once cut, the connector can be subjected to secondary operations and/or assembly processes. Exemplary secondary operations comprise: fastening operations (e.g., adhesive bonding, solvent bonding, ultrasonic welding, heat staking, stapling, screwing), coating operations (e.g., solvent coating, spray coating, embossing, and extrusion coating), annealing, labeling (e.g., printing, and adhesive labeling), and so forth, as well as combinations comprising at least one of the foregoing.

Coextrusion methods can also be employed for the production of a connector and/or socket. Coextrusion can be employed to supply differing polymers to any portion of a connector and/or socket geometry. This can be employed to improve and/or alter the performance of the connector/socket, such as disposing recycled materials in sections of the extruded profile, disposing an additional structural layer(s) on a portion of the extrudate, incorporating alternative materials, and so forth. In one embodiment, a coextrusion process can be employed to form a gasket between a connector and socket that comprises a differing material than is employed for the connector and/or socket. Those skilled in the art of coextrusion will comprehend the versatility of coextrusion processes and the myriad of applications the process provides.

Figure 12:
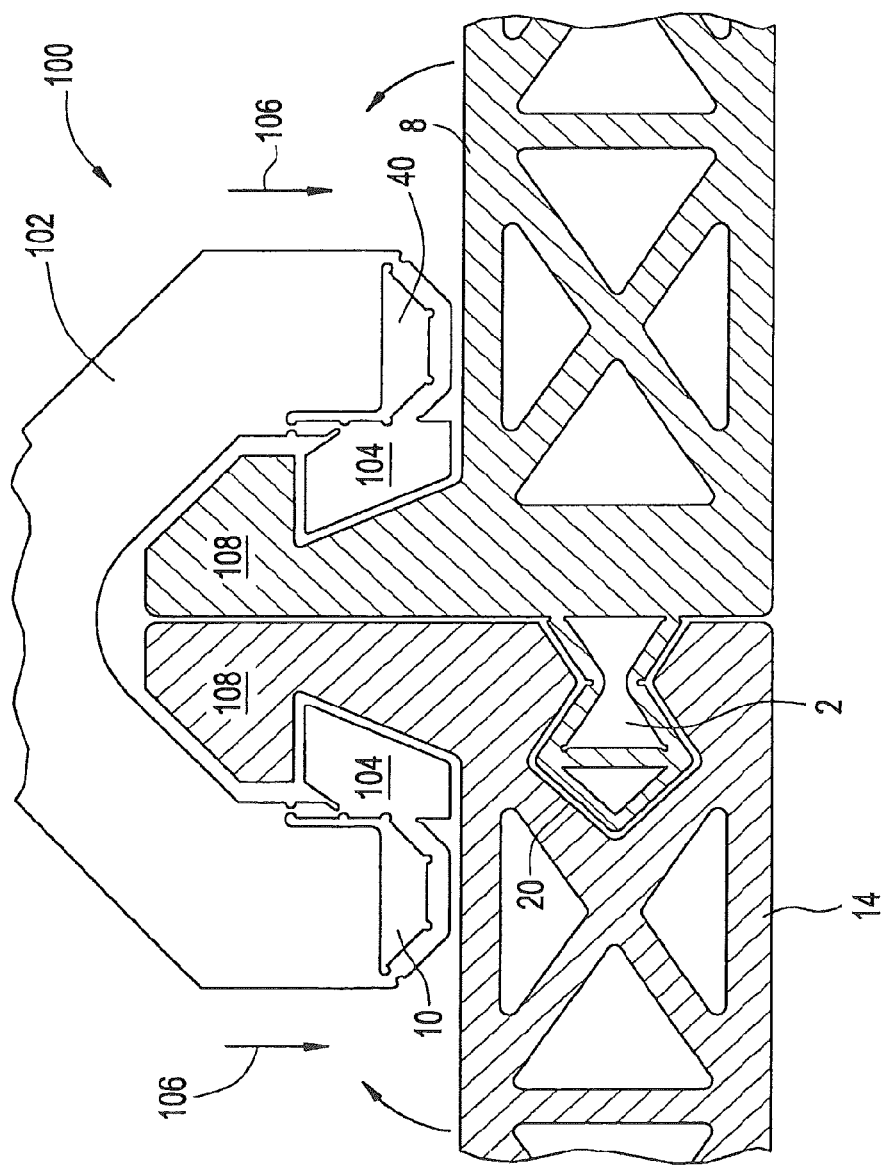
FIG. 12 is a partial side view of an exemplary capped assembly.

Referring now to FIG. 12, a partial side view of an exemplary capped assembly, designated 100, is illustrated. In the illustration, the capped assembly 100 comprises a connector cap 102, a first structure 8, and a second structure 14. The connector cap 102 comprises PFE connectors 40 that comprise retaining elements 104. The first structure 8 comprises a NFE connector 2 and a tab 108. The second structure 14 comprises a NFE socket 20 and a tab 108.

During use, if a force 106 is applied to the capped assembly 100, the NFE connector 2 will expand in transverse area and increase the retention forces. In addition, as the load increases, the first structure 8 and second structure 14 can deflect (e.g., rotate about the NFE connector 2), as shown by the directional arrows. As the structures deflect, the PFE connectors 40 on the connection cap 102 will be compressed, forcing the retaining elements 104 to compress against the tabs 108, thereby providing increased connection forces. In addition to employing rib-hinging mechanisms to increase connection forces, the capped assembly 100 can also provide improved leak resistance.

EXAMPLES

Figure 13:
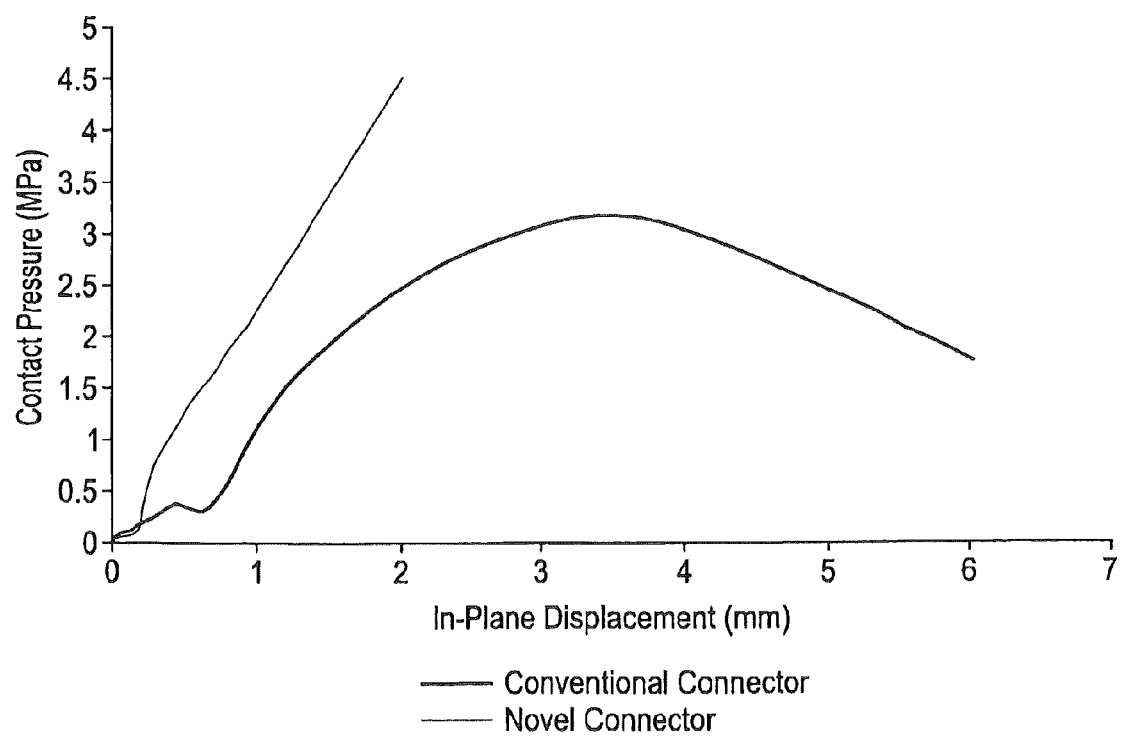
FIG. 13 is a graph is illustrated which compares the simulated contact pressure of a force expanding connector to a non-force expanding connector when acted upon by a disassembly force.
Figure 14:
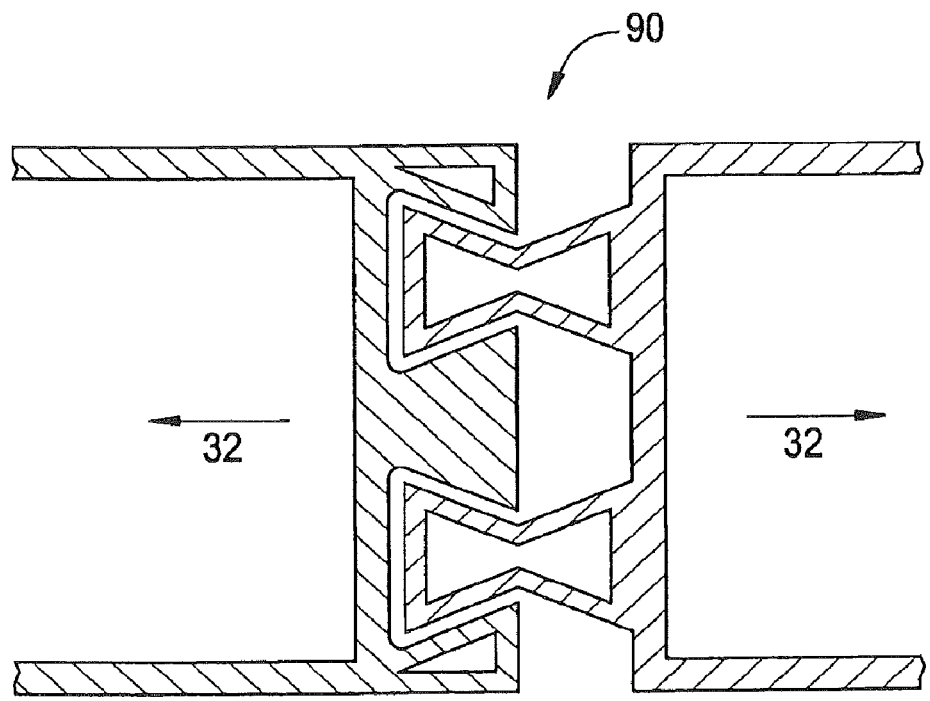
FIG. 14 is a partial and cross-sectional view of a simulated force expanding connector.
Figure 15:
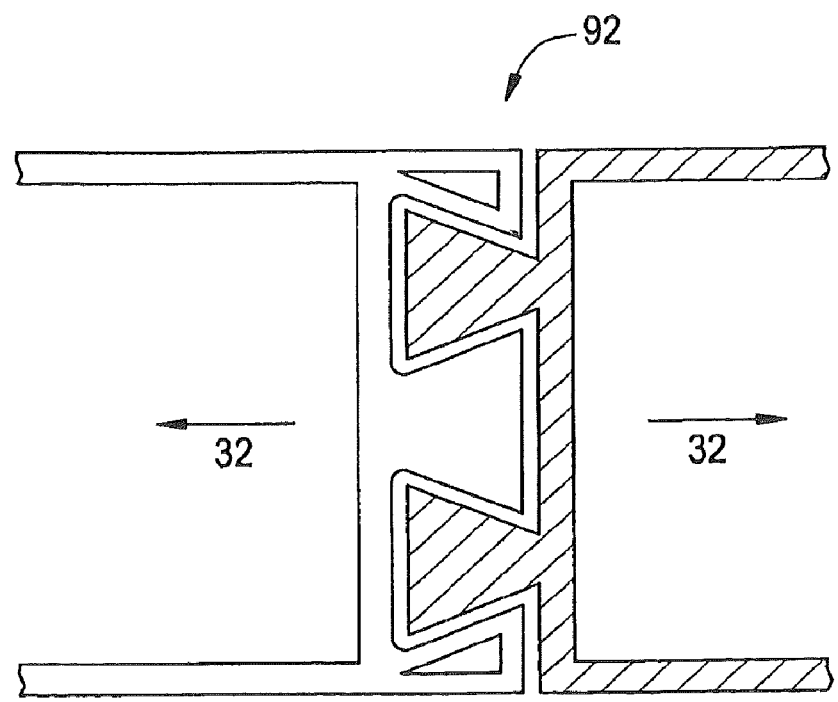
FIG. 15 is a partial and cross-sectional view of a simulated non-force expanding connector.

Referring now to FIG. 13, a graph illustrates the simulated contact pressure of a force expanding connector to a non-force expanding connector when acted upon by a disassembly force 32. To be more specific, referring to FIG. 14, a partial and cross-sectional view of the simulated force expanding connector, generally designated 90, is illustrated. Referring to FIG. 15, a partial and cross-sectional view of the simulated non-force expanding connector, generally designated 92, is illustrated. When these connectors (e.g., force expanding connector 90 and non-force expanding connector 92 were acted upon by a simulated disassembly force(s) 32, the simulated force expanding connector 90 produced a simulated peak contact pressure of about 4.5 megapascals, MPa (652.7 pounds per square inch, psi), whereas the simulated non-force expanding connector 92 produced a simulated peak contact pressure of about 3.25 MPa (471 psi). In addition, it can be seen that the in-plane displacement of the simulated force expanding connector 90 at peak contact pressure was about 2 millimeters, mm (0.079 inches, in), whereas the in-plane displacement of the simulated non-force expanding connector 92 at peak contact pressure was about 3.5 millimeters, mm (0.138 inches, in). It should be noted that the testing of the force expanding connector 90 was halted at 4.5 MPa due to test duration, and, therefore, the force generated by this connector exceeds about 4.5 MPa although not illustrated. The simulation was conducted on ABAQUS Finite Element Analysis software (Abaqus Inc., Providence, R.I.).

From these simulated results, it is shown that the simulated force expanding connector 90 produces greater peak contact pressure than the simulated non-force expanding connector 92, which illustrates the simulated force expanding connector 90 provides greater connection strength than the simulated non-force expanding connector 92. In addition, the simulated force expanding connector 90 reaches peak contact pressure at a lower in-line displacement than the simulated force non-expanding connector 90, which can provide for improved sealing against rain, snow, and the like.

The connectors disclosed herein comprise rib-hinging geometries that are capable of increasing retention forces when the connectors are acted upon by forces. More specifically, negative-force expanding assemblies 30 are disclosed that increase retention forces when acted upon by a disassembly force 32 (i.e., tensile force). Positive-force expanding assemblies 38 are also disclosed that increase retention forces when acted upon by a compressive force(s) 34. Yet further, multi-connector assemblies 50 are disclosed that comprise both negative-force expanding assemblies 30 and positive-force expanding assemblies 38 that can provide increased retention forces when acted upon by compression force(s), tensile forces (e.g., disassembly force(s) 32), as well as bending forces (e.g., snow, wind). In addition to providing increased retention forces when acted upon by forces, the connectors disclosed herein can be easily assembled and can be manufactured from cost-effective polymers using standard polymer processing methods, such as extrusion or injection molding. These connectors therefore provide several characteristics that are desirable and are currently unmet in the marketplace.

For clarity, unless defined otherwise, technical and scientific terms used herein have the same meaning as is commonly understood by one of skill in the art to which this invention belongs. The terms "first", "second", and "the like", as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable (e.g., ranges of "up to about 25 wt. %, or, more specifically, about 5 wt. % to about 20 wt. %," is inclusive of the endpoints and all intermediate values of the ranges of "about 5 wt. % to about 25 wt. %," etc.). The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., "the colorant(s)", includes one or more colorants). Furthermore, as used herein, "combination" is inclusive of blends, mixtures, alloys, reaction products, and the like. Lastly, if any patents are identified herein by number, they are incorporated by reference in their entirety.

Several designs of connectors are disclosed herein with references to individual figures. One of skill in the art will easily recognize that many of the components of each of the embodiments are similar to or identical to each other.

These various components can be added or omitted based on various design choices. As such, various elements and/or features can be introduced in a given figure with the understanding that the connectors can be modified as taught herein to include features illustrated in other embodiments. Each of these elements is first introduced in the discussion of a given figure, but is not repeated for each embodiment. Rather, distinct structure is discussed relative to each figure/embodiment.

What is claimed is:

1. A multiwall panel comprising:
multiple walls; and
a connector comprising a rib-hinging geometry, wherein the rib-hinging geometry comprises living hinges; and, wherein, the connector, when connected to another connector and/or a structure, and when acted upon by tensile force, compressive force, and/or bending force, is configured to change shape so as to increase retention force; wherein the multiwall panel comprises a negative force expanding connector and a positive force expanding connector, and wherein when a tensile force is applied, the negative force expanding connector increases in transverse width and when a compressive force is applied, the positive force expanding connector increases in transverse width.

2. The multiwall panel of claim 1, further comprising an open cavity within the living hinge after assembly.

3. The multiwall panel of claim 1, further comprising an open cavity within the living hinge before and after assembly.

4. The multiwall panel of claim 1, further comprising an internal feature disposed in the rib-hinging geometry, wherein the internal feature is capable of limiting the displacement of the rib-hinging geometry.

5. The multiwall panel of claim 1, further comprising a connector cap.

6. The multiwall panel of claim 1, wherein the connector has a closed geometry.

7. The multiwall panel of claim 6, wherein the connector has a bow-tie like geometry.

8. A panel connector comprising: a rib-hinging geometry, wherein the rib-hinging geometry comprises living hinges; and, wherein the connector, when connected to another connector and/or a structure, and when acted upon by tensile force, compressive force, and/or bending force, is configured to change shape so as to increase retention force; wherein the living hinges have a hinge thickness that is less than a thickness of a member connecting adjacent living hinges; wherein the connector comprises a negative force expanding connector and a positive force expanding connector, and wherein when a tensile force is applied, the negative force expanding connector increases in transverse width and when a compressive force is applied, the positive force expanding connector increases in transverse width.

9. The panel connector of claim 8, wherein the rib-hinging geometry is selected from the group consisting of a negative-force expanding geometry, a positive-force expanding geometry, and combinations comprising at least one of the foregoing.

10. The panel connector of claim 8, further comprising an internal feature disposed in the rib-hinging geometry, wherein the internal feature is capable of limiting the displacement of the rib-hinging geometry.

11. The panel connector of claim 8, further comprising a connector cap.

12. The panel connector of claim 8, wherein the connector has a closed geometry.

13. The panel connector of claim 12, wherein the connector has a bow-tie like geometry.

14. The panel connector of claim 8, further comprising an open cavity within the living hinge after assembly.

15. The panel connector of claim 8, further comprising an open cavity within the living hinge before and after assembly.

16. A multiwall panel, comprising: multiple walls; and a connector comprising a rib-hinging geometry, wherein the rib-hinging geometry comprises living hinges; and,
wherein the connector, when connected to another connector and/or a structure, and when acted upon by tensile force, compressive force, and/or bending force, is configured to change shape so as to increase retention force; wherein the living hinges have a hinge thickness that is less than a thickness of a member connecting adjacent living hinges; wherein the connector comprises a negative force expanding connector and a positive force expanding connector, and wherein when a tensile force is applied, the negative force expanding connector increases in transverse width and when a compressive force is applied, the positive force expanding connector increases in transverse width.

17. The multiwall panel of claim 16, further comprising an open cavity within the living hinge after assembly; wherein the rib-hinging geometry is selected from the group consisting of a negative force expanding geometry, a positive force expanding geometry, and combinations comprising at least one of the foregoing; and wherein the connector has a closed geometry.

18. The multiwall panel of claim 16, wherein the connector has a bow-tie like geometry.

* * * * *